(12) United States Patent
Pietricola et al.

(10) Patent No.: US 7,730,707 B2
(45) Date of Patent: Jun. 8, 2010

(54) EXTENDABLE HEADER FOR HARVESTING MACHINE

(75) Inventors: Paolo Pietricola, Kapellen (BE); Geert P. Mortier, Ghent (BE); Bart Moutton, Gits (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/459,690

(22) Filed: Jul. 7, 2009

(65) Prior Publication Data

US 2010/0011728 A1    Jan. 21, 2010

(51) Int. Cl.
*A01D 57/04* (2006.01)
(52) U.S. Cl. .......................................... 56/221
(58) Field of Classification Search ............... 56/221, 56/220, 219, 14.4
See application file for complete search history.

(56) References Cited

U.S. PATENT DOCUMENTS

| | | | | | |
|---|---|---|---|---|---|
| 2,795,920 | A | * | 6/1957 | Steuerwald | 56/221 |
| 2,873,567 | A | * | 2/1959 | Vogelaar et al. | 56/221 |
| 3,599,410 | A | * | 8/1971 | de Coene et al. | 56/221 |
| 3,945,180 | A | * | 3/1976 | Sinclair | 56/221 |
| 4,280,318 | A | * | 7/1981 | Koch | 56/221 |
| 4,377,930 | A | * | 3/1983 | Halls et al. | 56/221 |
| 4,565,056 | A | * | 1/1986 | Heidjann | 56/14.4 |
| 4,800,711 | A | * | 1/1989 | Hurlburt et al. | 56/219 |
| 4,956,966 | A | * | 9/1990 | Patterson | 56/181 |
| 5,261,216 | A | * | 11/1993 | Schumacher et al. | 56/14.4 |
| 5,711,140 | A | * | 1/1998 | Burmann | 56/208 |
| 5,752,372 | A | * | 5/1998 | Buermann | 56/10.2 E |
| 5,832,705 | A | * | 11/1998 | Eis et al. | 56/14.9 |
| 6,138,447 | A | * | 10/2000 | Stivers et al. | 56/221 |
| 6,442,918 | B1 | * | 9/2002 | Fox | 56/221 |
| 2009/0107094 | A1 | * | 4/2009 | Bich et al. | 56/10.2 E |

FOREIGN PATENT DOCUMENTS

| | | |
|---|---|---|
| DE | 19508887 | 9/1996 |
| EP | 0250649 | 1/1998 |
| EP | 0250650 | 1/1998 |

\* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A header for a harvesting machine having a frame, a cutterbar mounted on the frame operable to cut standing crop, the cutterbar being adjustable relative to the frame in a fore-and-aft direction, and a reel rotatably supported between a pair of reel arms pivotally mounted on the frame and operable to sweep crop material towards and over the cutterbar, a hydraulic cylinder extending between each reel arm and a corresponding side wall of the header frame to effect a generally vertical movement of the reel, comprising an interlock mechanism operably interconnecting the cutterbar and the hydraulic cylinder at each side of the header for adjusting the vertical position of the reel in response to a fore-and-aft movement of the cutterbar to maintain substantially constant the spacing and avoiding interference between the reel and the cutterbar.

12 Claims, 2 Drawing Sheets

EXTENDABLE HEADER FOR HARVESTING MACHINE

CROSS REFERENCE TO RELATED APPLICATIONS

This Patent Application claims priority under 35 U.S.C. §119 to EP 08.160.294.8, filed on Jul. 11, 2008 titled, "Extendable Header for Harvesting Machine" and having Geert P. Mortier, Paolo Pietricola and Bart Moutton as inventors. The full disclosure of EP 08.160.294.8 is hereby fully incorporated herein by reference.

BACKGROUND OF THE INVENTION

Typically, a header for a harvesting machine includes a cutterbar which is operable to cut standing crop as the machine moves forward and a rotatable reel which carries tines to engage the standing crop and sweep it towards the cutterbar for cutting and then carry the cut material towards an auger before releasing it. The auger usually consolidates the cut crop material centrally of the header before it is passed to the body of the machine for processing. The distance between the cutterbar and the auger is critical and in general the optimal position depends on the type and condition of the crop to be harvested. Therefore some header types have been provided with a cutterbar mounted to a forwardly extendable cutting table, enabling the operator of the harvesting machine to adapt its configuration when the crop condition or type changes.

When harvesting down crops, i.e., crops that are not standing in a normal upright position, the relationships between the reel, the cutterbar and the auger is equally critical and, in general, the reel should be disposed so that the path described by the outer ends of the tines first enters the down crop forwardly of the cutterbar and below the level thereof for lifting the crop, then sweep closely over the cutterbar and finally pass in close proximity along the auger.

Headers are known in which the cutterbar is vertically flexible along its length so that it can follow local irregularities in the ground. With such headers, it is necessary to be able to adjust the height of the reel relative to the highest point of the cutterbar at any given instant, otherwise the cutterbar is likely to foul the reel on flexing with consequential damage to one or both components. To this end, headers having flexible cutterbars have been fitted with means for automatically adjusting the position of the reel on vertical flexure of the cutterbar.

Similar problems may occur when the cutterbar of an extendable header is set to forwardmost position. Then the cutterbar will enter into the reel path that is required otherwise for harvesting down crops with a retracted cutting table. The tines or the bars of the reel may then damage the cutterbar or vice versa. Measures must be taken to prevent such interference and limit the path of the reel tines when the header is extended.

EP-A-0 250 649 describes an interlock mechanism including a linkage mechanism between the movable cutting table and the hydraulic actuators on each side of the header that position the reel in a vertical direction. The interlock mechanism includes a bell-crank lever pivotally mounted on the corresponding header side wall. The linkage interconnects the cutterbar and the lever, whereas the other lever arm holds the lower end of the actuator. The mechanism adjusts the position of the actuator and hence of the reel in response to a fore-and-aft adjustment movement of the cutterbar so as to maintain the minimal spacing between the reel and the cutterbar substantially constant.

Another existing mechanism, as used in the Varifeed™ headers of New Holland, uses a cam system for limiting the vertical position of the reel arm. The system comprises a linkage whereby a first arm is fixed to the movable cutterbar table and a second arm is fixed to the frame below the reel arm. At the end of the second leg a cam is fixed which makes contact with a roller installed on the reel arm when this arm is lowered. When the cutterbar moves forward, the first leg will pull on the second leg and rotate the cam, thereby pushing the roller upwards. As such, the reel arm is pushed upwards, hereby lifting the reel and avoiding interference with the cutterbar.

These known systems have some disadvantages. The connection point between the reel arm and the interlock mechanism, or the contact point between the cam and the roller is close to the rotation point of the reel arm. Considering the weight of the reel and the accelerations caused by operation on a bumpy field, the load on the interlock mechanism or the cam is high. Furthermore, the load is transferred directly to the frame, which is not advantageous for frame deformation and lifetime. Another disadvantage for the cam system is that the hydraulic lift cylinder is fixed to the frame, while the reel arm can be forced upwardly by the cam. Hereby, when extending the header and lifting the reel, the cylinder rod gets pulled outwards little resulting in oil or air getting drawn through the sealing of the cylinders.

As illustrated by DE-A-195 08 887, it is also conceivable to provide a sensor on the reel arm for contacting a cam surface on the movable cutterbar table when the cutterbar is extended. A control system reacts to the contact signal of the sensor by loading the hydraulic actuator and raising the reel arm until the sensor is disengaged from the cam. Such system entirely relies on the proper and continuous operation of the sensor, which is positioned in a vulnerable forward position close to the crop. Hence, it does not have the reliability of mechanical systems. Furthermore, it limits the available stroke of the actuator and the consequent vertical range of the reel.

It is an object of the present invention to provide a header with a fore-and-aft adjustable cutterbar to suit various crops and crop conditions and which avoids interference between the reel and the cutterbar upon adjustment of the cutterbar.

SUMMARY OF THE INVENTION

According to the present invention there is provided an extendable header for a harvesting machine having a frame, a cutterbar mounted on the frame operable to cut standing crop, the cutterbar being adjustable relative to the frame in a fore-and-aft direction, and a reel rotatably supported between a pair of reel arms pivotally mounted on the frame and operable to sweep crop material towards and over the cutterbar, a hydraulic cylinder extending between each reel arm and a corresponding side wall of said header frame to effect a generally vertical movement of said reel, and an interlock mechanism operably interconnecting the cutterbar and the hydraulic cylinder at each side of the header for adjusting the vertical position of the reel in response to a fore-and-aft movement of the cutterbar to avoid interference between the reel and the cutterbar, said interlock mechanism including a linkage mechanism at each side of the header, wherein each linkage mechanism comprises a body connected to the cutterbar and extending along a corresponding side wall of said header frame, said body following the generally horizontal movement of the cutterbar, and interconnecting means between said body and the hydraulic cylinder at each side wall of the header frame, said interconnecting means comprising guiding means for guiding the hydraulic cylinder in a generally vertical movement, and the body in a generally horizontal movement, said body further comprising adjustment means for effecting said vertical movement of the hydraulic cylinder in relation to said horizontal movement of the cutterbar.

In one embodiment said body is a plate with a generally wedge-like (triangular) shape being adapted to lift/lower the hydraulic cylinder accordingly as the body is moved forwardly or rearwardly by the cutterbar.

In another embodiment said body is a plate with a wedge-defining slot or groove applied into the body, having a shape adapted to lift/lower the hydraulic cylinder accordingly as the body is moved forwardly or rearwardly. The use of a slot or groove restricts the upward movement of the cylinder and the reel for a given position of the body.

Advantageously, the adjustments means, e.g. the shape of the wedge or of the slot, are configured for maintaining substantially constant the spacing between the reel and the cutterbar as the body is moved. Hence, once the operator has set an optimal spacing, this spacing will not be altered upon adjusting the forward position of the cutterbar.

The invention may provide adjustment means comprising a wedge-like or triangular shape applied along an edge or a side of said body, or into said body, along or into which the hydraulic cylinder is moved vertically as the body moves horizontally. Said triangular shape is adapted to lift/lower the hydraulic cylinder accordingly as the body is extended/retracted.

Advantageously the guiding means for the hydraulic cylinder comprise a generally vertical slot connected to the frame, whereby said vertical slot comprises a bearing ) connected to the hydraulic cylinder.

In a preferred embodiment the guiding means for the body comprise one or more rollers or bearings at each side of the body, at the upper and lower side of the body, for supporting the body in a generally horizontal movement.

In one embodiment the body is at least partly guided by the same guiding means as the hydraulic cylinder, such as e.g. the bearing in the vertical slot that is used for the vertical movement of the hydraulic cylinder.

The invention also provides interconnecting means comprising a functional connection between the guiding means of the hydraulic cylinder and the adjustment means of the body. In one embodiment the hydraulic cylinder interconnects with the cutterbar by sliding the bearing in the vertical slot along the wedge-like shape of the body connected to the cutterbar.

According to an advantageous embodiment of the present invention the hydraulic cylinder is supported fully by the upper ridge of a wedge-like shape of the body.

In one embodiment the hydraulic cylinder could be replaced by a fixed connection, meaning that the reel arm is connected to the vertical slot via a non-actuating connection.

The present invention has some important advantages over the prior art. High reaction loads on the frame are avoided, since the entire reel system is supported at a point remote from the pivot of the reel arms. Hereby frame deformation and lifetime are optimised. The arrangement also avoids outwards pulling movement on the cylinders during cutterbar extension, such that no oil will be drawn through the sealing of the cylinders. Furthermore, there is no reduction of the available stroke of the vertical lift cylinder, even when the knife is fully extended.

BRIEF DESCRIPTION OF THE FIGURES

The invention will now be described in further detail, by way of example only, with reference to the accompanying drawings, in which.

DETAILED DESCRIPTION OF THE PREFERRED EMBODIMENTS

Figure 1:
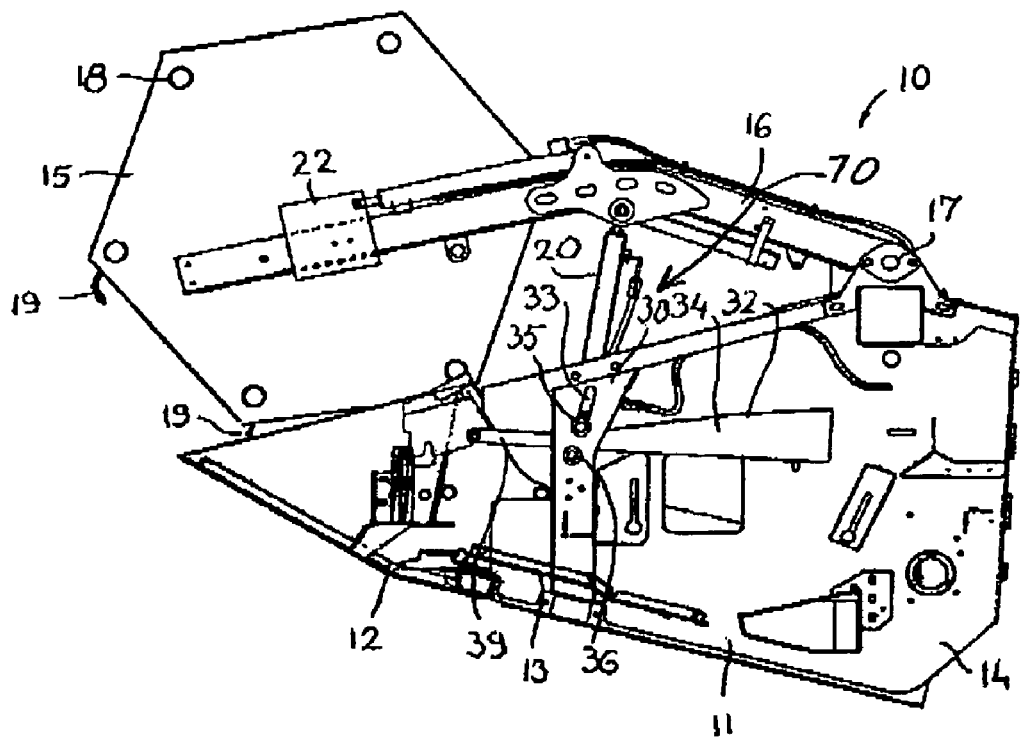
FIG. 1 is a side view of an extendable header in a fully retracted position, the header comprising a movable cutterbar table, an adjustable reel and a height control mechanism between the reel and the cutterbar according to a first embodiment of the invention.

FIG. 1 illustrates a header 10 comprising a main frame 11, a cutterbar 12 mounted on an extendable cutterbar table 13, a transverse auger (not shown) mounted in an auger trough 14, and a reel 15 mounted for rotation between the forward ends of a pair of reel arms 16, the other ends of which are pivotally connected at 17 to the frame 11 such that the reel 15 can be raised and lowered. The reel 15 carries transverse tine bars 18 fitted with tines 19 which are arranged to maintain a fixed orientation as the reel 15 rotates, in a conventional manner. The outer tips of the tines 19 describe a circular path. When the header is operating in down crops, the reel 15 is positioned as close as possible to the cutterbar 12 in order to optimise the cooperation between the reel 15 and cutterbar 12. More specifically the arrangement is such that the tine path extends as close as possible to the ground forwardly of the cutterbar 12 to lift down crop for presenting it to the cutterbar 12 to pass crop to the auger for consolidation centrally of the machine for passage through a central opening (not seen in the drawings) in the rear wall 23 of the header for processing by a conventional combine harvester (not shown) to which the header is, in use, fitted.

The operator can vary the position of the reel 15 in a generally vertical direction by means of a hydraulic cylinder 20, which is pivotably connected to the reel arm 16, and in a generally horizontal direction by means of a further cylinder 21. This second cylinder is arranged between a lug on the reel arm 16 and a reel bearing 22, which is slideably mounted on the front end of the reel arm 16.

Depending on the nature and condition of the crop to be harvested, the position of the cutterbar 12 has to be adjusted relative to the auger, and the reel 15 is adjusted relative to the cutterbar 12. In accordance with the present invention, the cutterbar 12 is adjustable in a generally fore-and-aft direction of the harvesting machine for which the header 10 is intended. The reel 15 is adjustable towards the ground and as close as possible towards the cutterbar 12 in each of its forwards positions.

Upon adjustment of the cutterbar 12 and/or the reel 15, interference between the reel tines 19 and the cutterbar 12 could occur if no precautions are taken. This is due to the fact that the cutterbar 12 and the reel 15 are adjustable in a plane intersecting with the tine path 11 of the reel 15 when the latter is in its lowermost position. Preferably, the reel tines 19 should reach below the level of the cutterbar 12 when the reel 15 is positioned for harvesting down crops. Forward adjustment of the cutterbar 12 inevitably would result in damage to the reel tines 19 in the first place, but eventually also to the cutterbar 12 in case the reel tines 19 are made of spring steel, as is conventional, rather than of synthetic material (plastic) as has been proposed in recent years.

In order to prevent said interference between the cutterbar 12 and the reel 15, the present invention provides an interlock mechanism 70 between the reel 15 and the cutterbar 12.

Figure 2:
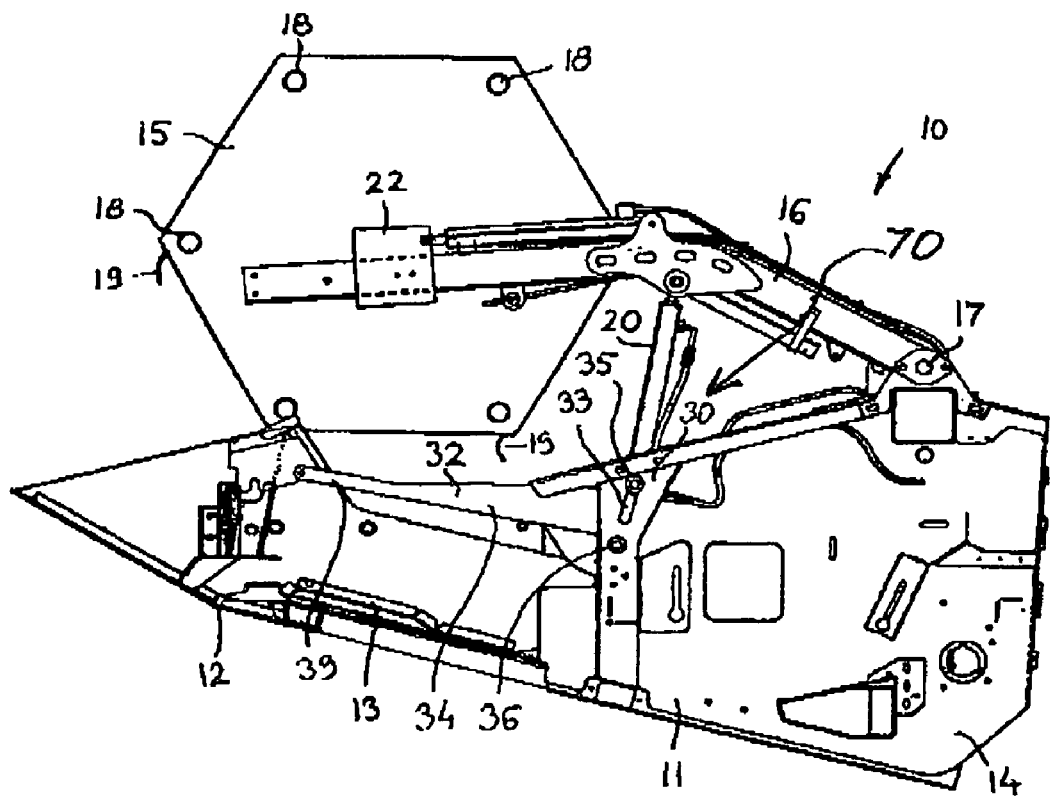
FIG. 2 is a side view of the extendable header of FIG. 1 in a fully extended position.

FIGS. 1 and 2 illustrate different embodiments of the present invention whereby the interlock 70 prevents interference by raising the reel 15 upon adjustment of the cutterbar 12 in the forward direction. Similarly, the interlock 70 lowers the reel 15 when the cutterbar 12 is retracted so as to maintain the vertical clearance between said reel 15 and the cutterbar 12 substantially constant.

The interlock 70 comprises on each side of the header a linkage mechanism which interconnects the reel arm 16 and the cutterbar 12 for limitation of the lowermost position of the reel 15 in relation to the forward position of the cutterbar 12. The reel 15 is connected to the header frame 11 by a reel arm 16. According to the invention the space between the reel 15 and the cutterbar 12 is controlled by a hydraulic lift cylinder 20 moveably connected to the cutterbar 12.

Each linkage mechanism comprises a hydraulic cylinder 20 having an upper end connected to the reel arm 16 and a lower end to a portion of the frame 11. The hydraulic cylinder 20 is connected to the frame 11 via the embodiments of the present invention. According to the present invention, this connection to the frame is not fixed, but movable.

FIGS. 1 and 2 illustrate a first embodiment wherein a side portion 30 of the frame 11 comprises a substantially vertical slot 33 and two bearings 35, 36, an upper movable bearing 35 and a lower fixed bearing 36. The lower end hydraulic cylinder 20 is connected to the upper bearing 35, which is movable in the upright slot 33. A body 32, connected to the movable cutterbar table 13, is guided inbetween the two bearings 35, 36 whereby the upper ridge of the wedge-like shape 34 of the body 32 moves the upper bearing 35 as the body is moved horizontally. The side of the wedge 34 closest to the back of the frame 11 has the bigger wedge side.

When the cutterbar 12 is adjusted from the fully retracted position of FIG. 1 to the fully extended position of FIG. 2, the wedge-like body 32 is pulled out, thus imparting a lifting to the associated hydraulic cylinder 20 relative to the header frame 11, whereby the related reel arm 16, and hence reel 15, is lifted. The top angle of the wedge shape 34 is chosen such that the distance between the reel 15 and the cutterbar 12 is maintained substantially constant on horizontal adjustment of the cutterbar 12. The relative horizontal position of the reel 15 and the auger equally is maintained substantially constant on adjustment of the cutterbar 12 as the pivot connection 17 of the reel arm 16 on the frame 11 is chosen close to the auger axis. The height of wedge shape 34 is specifically adapted to avoid interference between the reel 15 and the cutterbar 12 when the hydraulic cylinder 20 is fully retracted and the reel 15 is in its lowermost position. The shape 34 further is adapted to keep the distance between the reel 15 and the cutterbar 12 quasi constant.

In an alternative embodiment the lower bearing 36 is replaced by one or more bearings fixed to the frame, either located under the vertical slot, or located at any other position for supporting the wedge body 32.

Each linkage system may further comprise a damper or spring to prevent the reel from jumping up and down when the cutterbar 12 is not fully extended. However, it has been experienced that the weight of the reel 15 itself provided enough vertical load to maintain contact between the bearing 35 connected to the hydraulic cylinder 20 and the upper ridge of the wedge 32.

The upper bearing 35 may comprise a transversely positioned stub shaft and a roller mounted thereon, which is engaged by the ridge of the wedge body 32. Advantageously the roller is profiled for maintaining the vertical position of the body 32 during its movement. The lower bearing 36 may comprise a similar arrangement for guiding the lower edge of the body 32.

According to another embodiment of the present invention there may be provided one or more extra upper bearings for guiding the body.

In one embodiment the wedge-like shaped body 32 further has an extra top ridge extension towards the back of the frame in order to allow the bearing 35 of the hydraulic cylinder 20 to follow the shape 34.

In a second embodiment the frame 11 comprises a substantially vertical slot 33 with one bearing 35 connected to the hydraulic cylinder 20; wherein said bearing is also running in a rearwardly and upwardly inclined slot 40 comprised in the body 32'; the body is guided inbetween upper rollers 42 and lower rollers 43 whereby the wedge-like shape 34 of the rearwardly inclined slot 40 moves the bearing 35 in the vertical slot 33 as the body 32' is moved horizontally.

Figure 3:
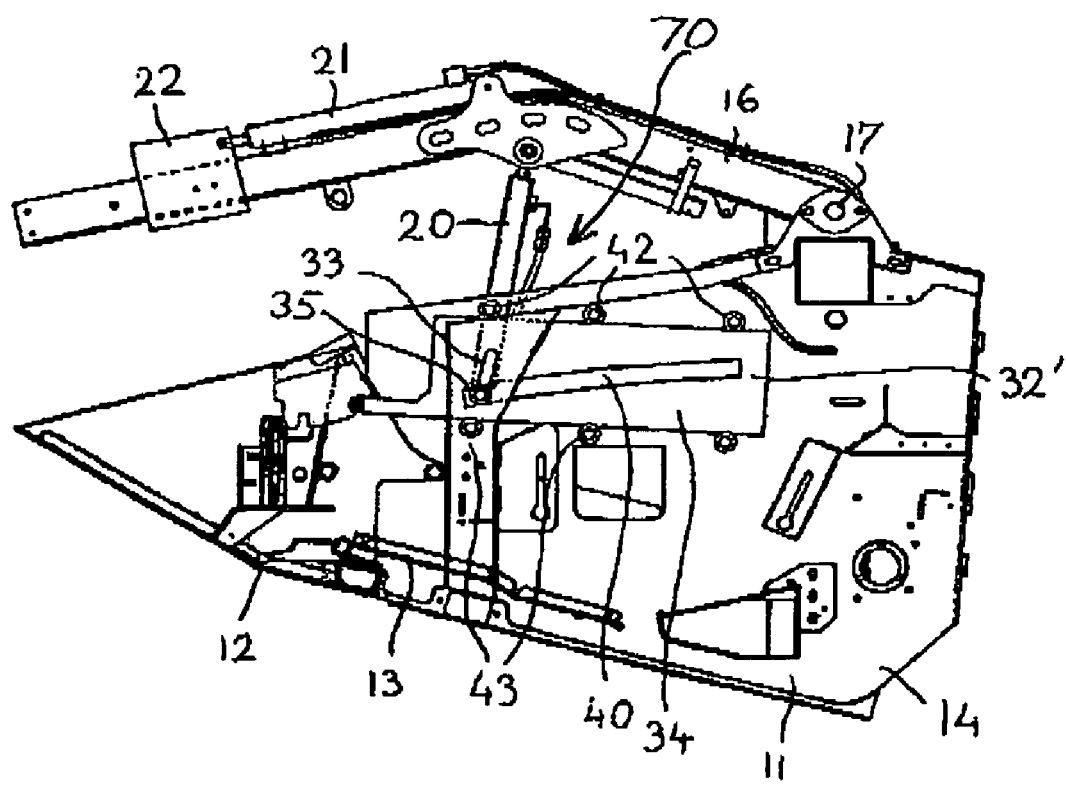
FIG. 3 is a side view of a reel height control mechanism between the reel and the cutterbar according to an alternative embodiment of the invention.

FIG. 3 illustrates the second embodiment of an interlock mechanism according to the invention, wherein the connection between the hydraulic cylinder 20 and the frame 11 is similarly connected to the frame by a shaft with a bearing 35 that can slide in an upright slot 33. Each linkage system further comprises a side plate or body 32' connected on one side to the movable table 13 of cutterbar 12 and on the other side to the frame 11. The side plate can slide between three pairs of rollers, each pair comprising a roller 42 on the upper side and a roller 43 on the lower side. The side plate 32' comprises a rearwardly and upwardly inclined slot 40 wherein the bearing 35 of the hydraulic cylinder 20 can slide. As such, the connection of the hydraulic cylinder 20 is actually an interaction between an upright slot 33 for the connection to the reel 15 and a horizontal slot 40 for the connection to the cutterbar 12, where inbetween the side plate 32' can move.

When the cutterbar 12 is adjusted from the fully retracted position to the extended position, the side plate 32' connected to the cutterbar 12 is pulled out, thus imparting a lifting to the lower end of the hydraulic cylinder 20 relative to the header 10, whereby the related reel arm 16, and hence reel 15, is lifted. The shape 34 of the horizontal slot 40 in the side plate 32' is specifically adapted to avoid interference between the reel 15 and the cutterbar 12 and to keep the distance between the reel 15 and the cutterbar 12 quasi constant.

The specifically adapted wedge shape 34 of the side plate slot 40 may also be provided by any other means. In one embodiment the wedge-like shape is a groove instead of a slot, wherein the reel arm 16 bearing can slide. In another embodiment an outer sliding mechanism may be provided, e.g. one comprising slide blocks instead of roller bearings.

In one embodiment the movable body supporting for the hydraulic cylinder is connected directly to the cutterbar 12. In another embodiment the support is connected indirectly to the cutterbar 12, e.g. by a linkage system.

The interlock 70 between the reel 15 and the cutterbar 12 remains operative irrespective of a relative fore-and-aft position of the reel 15 in the event fore-and-aft reel adjustment means are provided.

In one embodiment the reel arm 16 may comprise a separate hydraulic cylinder 20 to control the fore-and-aft position of the reel 15. In another embodiment one hydraulic cylinder 20 for each linkage system controls both the height and the fore-and-aft position of the reel 15, e.g. when the hydraulic cylinder is connected directly to the reel bearing 22. Extension or retraction of the cylinder 20 then simultaneously lifts the reel arm 16 and slides the bearing 22 rearwardly or forwardly over the reel arm 16.

Thus the present invention provides a header with a cutterbar which is adjustable generally fore-and-aft of the machine to which the header is fitted, this adjustment automatically altering the position of the reel relative to the cutterbar by virtue of the provision of the interlock mechanism between these two components whereby interference between these two components, upon fore-and-aft adjustment of the cutterbar, automatically is avoided. It will also be understood by one skilled in the art that an automatic adjustment of the reel position in response to the fore-and-aft movement of the cutterbar is particularly important under circumstances where the cutterbar movement can be accomplished on the go, i.e., during operation of the combine.

It will be understood that changes in the details which have been described and illustrated to explain the nature of the invention will occur to and may be made by those skilled in the art upon a reading of this disclosure within the principles and scope of the invention. As an example, it will be appreciated that the interlock mechanism 70 may be disposed between the cutterbar 12 and the pivot 17 for the reel arms 16, whereby cutterbar movement results either in rotation of the reel arms 16 about the pivot 17 or shifting of the reel arm pivot axis 17 itself so as to maintain a substantially constant reel/cutterbar gap. It will be appreciated that linkage mechanisms other than those illustrated in the drawings may be employed in the interlock arrangement.

It will be appreciated that the hydraulic cylinder 20 for the vertical positioning of the reel is fully supported by the wedge-like body 32, 34, whereas in known systems the support was weak.

Furthermore, the interlock mechanism may be hydraulic; e.g. the wedge-like shaped plate connected to the cutterbar may be replaced by a hydraulic cylinder so that, as the cutterbar is adjusted, the length of the cylinder changes. A smaller body in the shape of a wedge or a cam may then be used to adjust the correct vertical movement of the reel arm 16 in relation to the horizontal movement of the cutterbar. In a further embodiment the oil displaced by the cylinder can be used for lifting the reel.

The invention claimed is:

1. An extendable header for a harvesting machine having:
    a frame;
    a cutterbar mounted on the frame operable to cut standing crop, the cutterbar being adjustable relative to the frame in a fore-and-aft direction;
    a reel rotatably supported between a pair of reel arms pivotally mounted on the frame and operable to sweep crop material towards and over the cutterbar;
    a hydraulic cylinder extending between each reel arm and a corresponding side wall of said header frame to effect a generally vertical movement of said reel; and
    an interlock mechanism operably interconnecting the cutterbar and the hydraulic cylinder at each side of the header for adjusting the vertical position of the reel in response to a fore-and-aft movement of the cutterbar to avoid interference between the reel and the cutterbar,
    said interlock mechanism including a linkage mechanism on each side of the header, wherein each linkage mechanism comprises:
    a body connected to the cutterbar and extending along a corresponding side wall of said header frame, said body following the generally horizontal movement of the cutterbar; and
    interconnecting means between said body and the hydraulic cylinder at each side wall of the header frame, said interconnecting means comprising guiding means for guiding the hydraulic cylinder in a generally vertical movement, and the body in a generally horizontal movement,
    said body further comprising adjustment means for effecting said vertical movement of the hydraulic cylinder in relation to said horizontal movement of the cutterbar, wherein said body is a plate with a wedge-defining slot or groove applied into the body, said wedge-defining slot or groove having a shape adapted to lift or lower the hydraulic cylinder accordingly as the body is moved forwardly or rearwardly, wherein said adjustment means includes a wedge-like or generally triangular shape applied along an edge or a side of said body, or into said body, along or into which the hydraulic cylinder is moved vertically as the body moves generally horizontally, said triangular shape being adapted to lift or lower the hydraulic cylinder accordingly as the body is moved forwardly or rearwardly.

2. The header according to claim 1 wherein the adjustment means are configured for maintaining substantially constant the spacing between the reel and the cutterbar as the body is moved forwardly or rearwardly.

3. The header according to claim 1 wherein said guiding means for the hydraulic cylinder includes a generally vertical slot connected to the frame, said vertical slot comprising a bearing connected to the hydraulic cylinder.

4. The header according to claim 1 wherein said guiding means for the body includes one or more rollers or bearings at the lower side of the body.

5. The header according to claim 4 wherein said guiding means for the body includes one or more rollers or bearings at the upper side of the body.

6. The header according to claim 1 wherein the body is at least partly guided by the same guiding means as the hydraulic cylinder.

7. The header according to claim 1 wherein said interconnecting means includes a functional connection between the guiding means of the hydraulic cylinder and the adjustment means of the body.

8. The header according to claim 1 wherein said hydraulic cylinder is replaced by a fixed connection.

9. The header according to claim 1 wherein the frame is provided with a generally vertical slot, which receives an upper movable bearing, and with a lower fixed bearing,
    the hydraulic cylinder being connected to the upper movable bearing and the body being guided in between the two bearings, whereby the wedge-like shape of the body moves the upper bearing as the body is moved horizontally.

10. The header according to claim 9 wherein the lower bearing is replaced by one or more bearings fixed to the frame, either located under the vertical slot, or located at any other position for supporting the body.

11. The header according to claim 9 including one or more extra upper bearings for guiding the body.

12. The header according to claim 1 wherein the frame includes a generally vertical slot with one bearing connected to the hydraulic cylinder; said bearing also running in an inclined slot comprised in the body,
    the body being guided in between a set of upper rollers and a set of lower rollers whereby the wedge-defining shape of the inclined slot moves the bearing in the generally vertical slot and the inclined slot as the body is moved horizontally.

* * * * *